United States Patent [19]

Lehr et al.

[11] Patent Number: 4,896,905
[45] Date of Patent: Jan. 30, 1990

[54] THREE-POINT LATCH FOR SWITCH CABINET

[75] Inventors: Lothar Lehr, Burbach; Manfred Wetzel, Ewersbach, both of Fed. Rep. of Germany

[73] Assignee: Rittal-Werk Rudolf LOH GmBH & Co. KG, Herborn, Fed. Rep. of Germany

[21] Appl. No.: 174,646

[22] Filed: Mar. 29, 1988

[30] Foreign Application Priority Data

Mar. 30, 1987 [DE] Fed. Rep. of Germany ..... 37105639

[51] Int. Cl.4 ............................................. F03C 5/00
[52] U.S. Cl. ........................................ 292/5; 272/33; 272/23; 272/9; 272/241
[58] Field of Search ................. 312/215; 292/3, 5, 33, 292/23, 35, 41, 39, 193, 12, 9, 240, 241, 75, 77, 79, 73, 239, DIG. 57; 174/35 GC, 35 MS

[56] References Cited

U.S. PATENT DOCUMENTS

| Re. 15,619 | 6/1923 | Massoll | 292/39 |
|---|---|---|---|
| 556,572 | 3/1896 | Bataille | 292/193 X |
| 1,038,111 | 9/1912 | Foss | 292/75 |
| 2,166,535 | 7/1939 | Sarenholm et al. | 292/5 |
| 3,110,512 | 11/1963 | Scalf et al. | 292/39 X |
| 3,140,426 | 6/1964 | Defandorf et al. | 292/75 X |
| 3,247,312 | 4/1966 | Alessi | 174/35 GC X |
| 3,333,878 | 8/1967 | Pelcin | 292/41 X |
| 3,589,070 | 6/1971 | Hansen | 174/35 MS X |
| 3,767,239 | 10/1973 | Horgan, Jr. | 292/5 X |
| 3,953,061 | 4/1976 | Hansen et al. | 292/5 |
| 4,571,449 | 2/1986 | Lindenberger et al. | 174/35 MS |
| 4,590,710 | 5/1986 | Newland | 174/35 GC X |
| 4,631,937 | 12/1986 | Debus et al. | 70/207 |
| 4,641,865 | 2/1987 | Pastva | 292/5 |
| 4,665,654 | 5/1987 | Stedron et al. | 49/484 |
| 4,760,214 | 7/1988 | Bienia et al. | 174/35 GC |
| 4,760,496 | 7/1988 | Koch | 174/35 GC X |

FOREIGN PATENT DOCUMENTS 7521270 7/1976 Fed. Rep. of Germany .
8429153 1/1985 Fed. Rep. of Germany .

Primary Examiner—Gary L. Smith
Assistant Examiner—Eric K. Nicholson

[57] ABSTRACT

This invention is an improved switch cabinet latch of the type having a cabinet body and a cabinet door hinged to it with the door held in closed position by means of a push-rod lock on the cabinet door with push rods movable axially by rotational movement of an actuating element such that in the closed position closing ends on the push rods which face away from the push-rod lock reach behind closing faces mounted on the cabinet body while in the open position they move away from the closing faces. By virtue of the special configuration of the ends of the push rods and lock blocks mounted on the cabinet body, an improved clamping of the door to the cabinet body is achieved in combination with a hasp of the push-rod lock in the closed position. This clamping is initiated in forced sequence by two steps in the rotational movement of the actuating element of the push-rod lock.

20 Claims, 3 Drawing Sheets

THREE-POINT LATCH FOR SWITCH CABINET

FIELD OF THE INVENTION

This invention is related to switch cabinets of the type with a cabinet body and cabinet door held in closed position on the cabinet body by a push rod-type lock mounted on the door. In such devices, axially-adjustable push rods on the door are operable through the push-rod lock, where a rotatable actuating element is coupled to the push rods. When in the closed position, closing ends of the push rods, which face away from the lock itself, reach behind closing faces mounted on the cabinet body and in the open position they are away from the area of the closing faces.

BACKGROUND OF THE INVENTION

As demonstrated in German Pat. No. OS 1,950,153, a push-rod lock can be operated with a key or a latch and can set the positions of one or two push rods. Locking of a cabinet door to a cabinet body then takes place only by means of the locking ends of the push rods. As shown in German Pat. No. GM 84 29 153, the push rods are axially movable on the cabinet door and their locking ends are designed in a fork shape. The locking ends are pushed into the closed position onto a holding pin that is part of a holding block mounted on the cabinet body or onto a U-shaped plate mounted on the cabinet body.

This method of locking the cabinet door to the cabinet body is not adequate especially when the switch cabinet is very high and the door to the cabinet does not have good torsional rigidity. Furthermore, the bracing of the cabinet door to the cabinet body is not uniform so that the closed position of the cabinet door may not be well sealed.

OBJECT OF THIS INVENTION

The object of this invention is to provide a switch cabinet latch of the type generally described above which, even with large dimensions of the cabinet door, achieves a definite bracing of the door to the cabinet body, and which may be made with simple sturdy components which can withstand substantial forces.

BRIEF SUMMARY OF THE INVENTION

This objective is achieved in accordance with this invention by having push-rod locking ends which carry rotatably-mounted rollers. The device of the invention is arranged such that when the actuating element is turned and the push rods are shifted away from the open position they first impart a door-closing movement by interaction of the rollers with lock blocks mounted on the cabinet body. In such interaction, the door is brought closer to the cabinet body by the action of the rollers against transition surfaces of the lock blocks, which surfaces are oriented at an acute angle to the direction of movement of the push rods and face away from the cabinet door. As the actuating element is turned farther and the push rods are shifted farther, the rollers eventually reach behind the locking blocks, on the side thereof facing away from the cabinet door, and appropriately-inclined locking surfaces of the closing ends, which face the cabinet door, work together with the transition surfaces of the locking blocks and put the cabinet door under tension against the cabinet body. A hasp rigidly connected to the actuating element of the push-rod lock has a locking nose which, with a further turn of the actuating element, can be turned in behind a holding block mounted on the cabinet body.

In this invention, the closing ends on the push rods move over the transition surfaces of the lock blocks when the cabinet door is moved to the cabinet body and the push-rod lock is actuated in the closed direction. When the rollers roll on the transition surfaces of the lock blocks, such blocks are so sturdy that no damage can occur in the process. When the rollers have passed the transition surfaces, the cabinet door is then in a set position relative to the cabinet body. The rollers are then guided behind the lock blocks, that is, on the back side which faces away from the cabinet door.

The transition surfaces of the lock blocks are inclined so that they face away from the cabinet door and, in combination with the locking surfaces of the push-rod closing ends, serve to brace the cabinet door against the cabinet body. The locking surfaces of the closing ends move along the transition surfaces so that adequate substantial force, specifically, door-closing force, is exerted on the cabinet door when the push-rod lock is turned further into the lock position.

When the cabinet door has reached the set initial locking position, a further turn of the actuating element of the push-rod lock serves to clamp the cabinet door to the cabinet body as this position along the door. To do so, the hasp is provided with a locking nose connected to the actuating element of the push-rod lock in such a way that it cannot turn and works together with the holding blocks mounted on the cabinet body. Then only when the actuating element is turned further and the hasp is moved out of the preliminary closed position into the final closed position does the locking nose come to rest on the side of the holding block facing away from the cabinet door to clamp the cabinet door to the cabinet body.

The door-closing movement initiated by the rollers of the closing ends is optimally transferred to the cabinet door when the invention is built in such a way that the axes of rotation of the rollers are parallel to the cabinet doors and perpendicular to the hinge axis of the cabinet door.

In one embodiment, the closing ends have various separate parts which are connected to the free ends of the push rods, and each closing end and its respective push rod are held between two plastic guide parts. The two plastic guide parts together with the closing end are guided into a sleeve-shaped guide housing which is connected to the inside of the cabinet door in a manner such that the two plastic guide parts are movable. The push rods may be made out of sections of a flat stock of material, and noiseless movement within the guide housings is achieved by means of the plastic guide parts.

The rotational mount of the rollers is implemented in another embodiment of this invention in such a way that the closing end facing away from the push rod terminates in two bearing plates between which the roller is rotatably mounted. Adjoining the bearing plates the closing end has an inclined locking surface which faces the cabinet door and is offset from the roller.

In addition, the locking block is configured such that it is symmetrical about a central transverse plane and has two transition surfaces sloping toward each other and facing away from the cabinet door. In such cases, the locking block can also be used for either of the two locking rod ends, because it can be secured to the cabinet body with the same mounting fixtures in either of two orientations 180 degrees apart.

According to another embodiment of this invention, the connection between the push rod, the closing end and the two plastic guide parts is designed in such a way that the two plastic guide parts, the respective push rod and the closing end are held together by a cross pin which is inserted into aligned bores in these parts and held there by the guide housing.

The additional force of the cabinet door against the cabinet body in the area of the push-rod lock between the preliminary locking position and the final locking position is achieved by the fact that the holding block is recessed in a semicircular shape in the area of the rotation of the hasp which recess has a diameter corresponding to the diameter of the hasp. The hasp has a round cross-section with the radially-projecting locking nose which, when in the open position, extends perpendicular to the direction of movement of the push rods and is outside the recess of the holding block. Only after turning the hasp through a given angle of rotation in the closing direction does the locking nose turn into the area of the recess on the back side of the holding block, which faces away from the cabinet door. Then, with a further turn of the hasp into the locked position, it clamps the cabinet door to the cabinet body in the area of the push-rod lock.

The sealing of the cabinet door against the cabinet body is achieved by the fact that the switch cabinet has a frame that forms a projecting sealing edge running around the outer edge in the area of the open side of the cabinet body. The inside of the cabinet door is provided with a matching sealing element which is arranged to engage the peripheral sealing edge.

The closed position of the closing ends on the push rods may be maintained by means of locking ridges which the rollers pass over in their movements between the transition surface and the back side of the locking blocks. The rollers catch behind such locking ridges. To open the cabinet door, the door must first be pushed even more tightly against the cabinet body so that the rollers can pass back over the locking ridges.

BRIEF DESCRIPTION OF THE DRAWINGS

This invention will now be described in more detail by means of a practical embodiment shown in the following figures.

DETAILED DESCRIPTION OF PREFERRED EMBODIMENT

Figure 1:
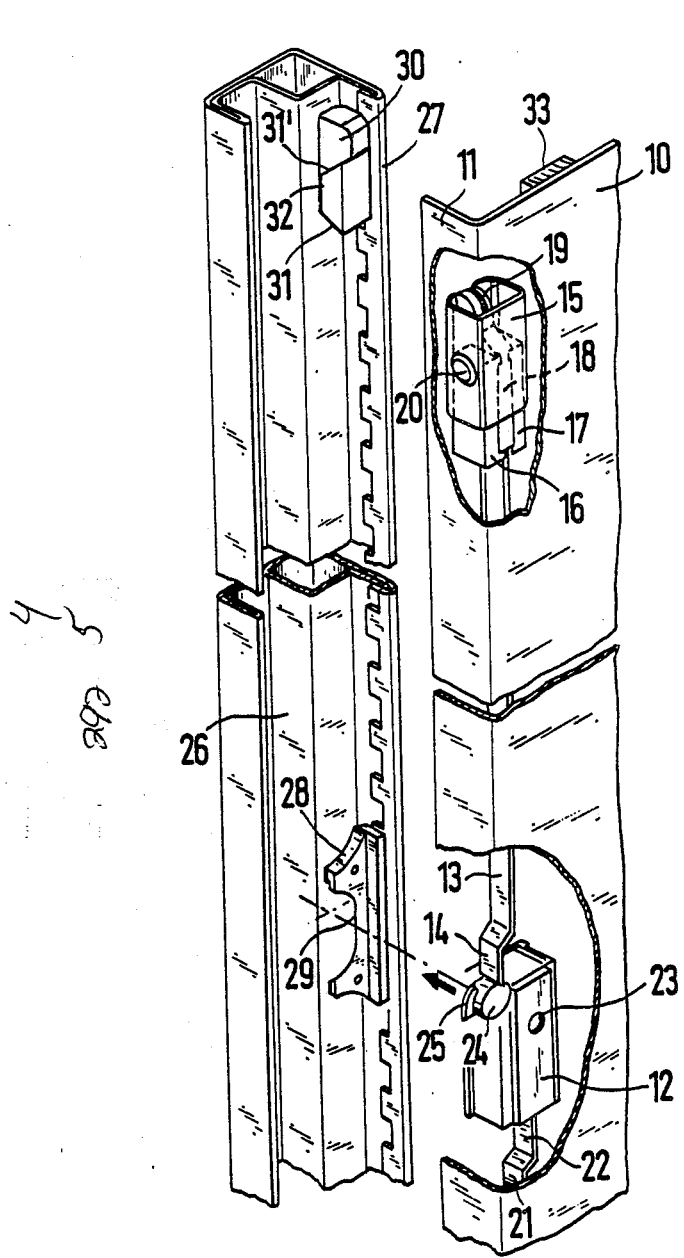
FIG. 1 is a fragmentary perspective view of the locking parts of the switch cabinet mounted in the area of the closing edge of the cabinet body and on the cabinet door.

In the practical embodiment illustrated in FIGS. 1-4, a panel-shaped cabinet door 10 is provided with a bent edge 11 running around its periphery. The bend in cabinet door 10 along the cabinet body and the design of the cabinet body are not relevant to the purposes of this invention. The only part of the cabinet body which is shown is the vertical frame arm 26 in the area of the closing edge. Vertical frame arm 26 has a projecting sealing edge 27.

Lock blocks 30 and holding block 28 are mounted along sealing edge 27 of the frame arm. Push-rod lock 12 is mounted on the inside of cabinet door 10 midway along the height of the door and its actuating element (not shown) is accessible through orifice 23. The actuating element is linked to two push rods 13 and 21 which come from opposite directions to the actuating element via angled portions 14 and 22. By turning the actuating element, push rods 13 and 21 are shifted axially in opposite directions, the direction of rotation of the actuating element determining whether push rods 13 and 21 are pushed into the closed position or the open position.

In the area of the closing edge, push rods 13 and 21 are adjustably guided immediately next to bent edge 11 to end portions having closing ends 18 designed as separate parts. Two plastic guide parts 16 and 17 are slideably guided within a sleeve-like guide housing 15 which is attached to cabinet door 10 in a manner such that the closing end and its two plastic guide parts are axially movable. Plastic guide parts 16 and 17 are identically designed and form a fixture at the end of push rods 13 and 21 and closing end 18. All such parts have aligned bores through which a cross pin is inserted. Such cross pin joins plastic guide parts 16 and 17, push rods 13 and 21, and closing end 18.

Closing end 18 terminates in two bearing plates 18b at its end away from push rod 13 or 21, and a roller 19 is rotatably mounted between bearing plates 18b. The axis of rotation here is parallel to cabinet door 10 and perpendicular to the closing edge. Lock block 30 is mounted in the area of the cabinet body which is adjacent to closing end 18. Lock block 30 has a transition surface 31 on the lower side thereof inclined at an acute angle to the direction of movement of push rods 13 and 21 followed by a transition to its back side 32 facing away from cabinet door 10. Lock block 30 may be designed as shown to be symmetrical about a central transverse plane by having a transition surface 31' with an opposite slope. When designed this way, lock block 30 can be turned 180 degrees and used for the lock block for push rod 21 with the same mounting fixtures.

Push-rod lock 12 has a hasp 24 with a radially projecting locking nose 25 which is connected to the actuating element so that it is turned with it. Hasp 24 works together with holding block 28 on the cabinet body as explained in greater detail below.

Figure 2:
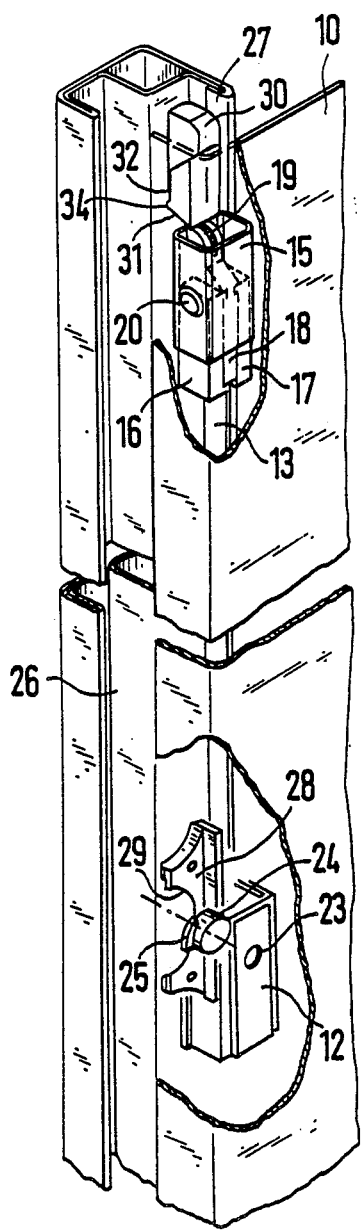
FIG. 2 illustrates the cabinet door advanced to the cabinet body in position for actuation of the push-rod lock to begin.
Figure 3:
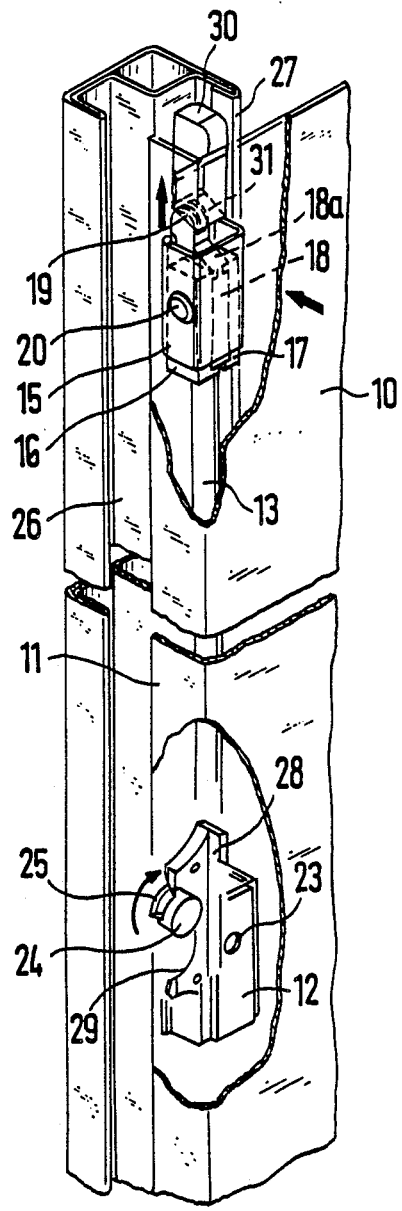
FIG. 3 illustrates the device with the cabinet door is brought into a preliminary closed position by means of the rollers of the closing ends.

As shown in FIG. 2, in closing the switch cabinet, cabinet door 10 is advanced toward the cabinet body. In doing so, rollers 19 of the closing ends 18 are adjacent to transition surfaces 31 of the respective lock blocks 30. When the actuating element of push-rod lock 12 is turned toward the closing position, push rod 13 is shifted upward and push rod 12 is moved downward. Rollers 19 roll along transition surfaces 31 of lock blocks 30 as shown in FIG. 3. Further closing movement is imparted to cabinet door 10. When rollers 19 have passed transition surfaces 31, they reach back side 32 of lock blocks 30, as shown in FIG. 4.

Figure 4:
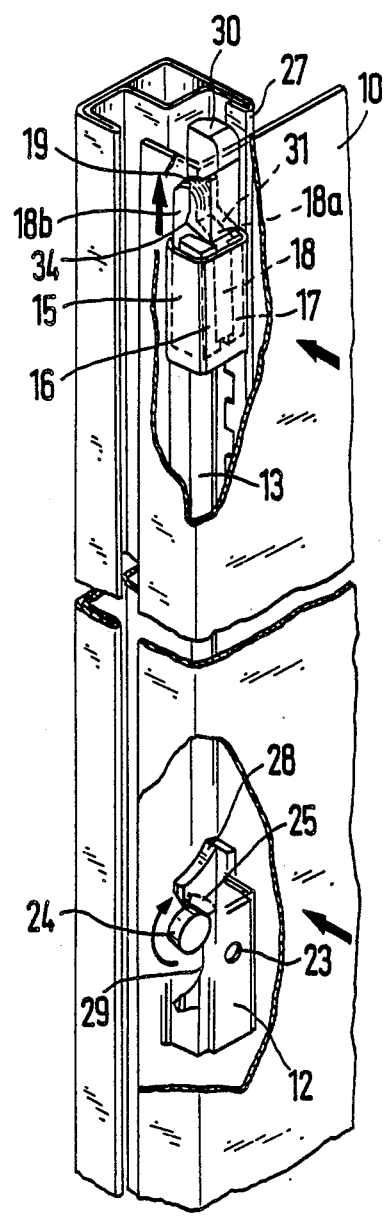
FIG. 4 illustrates the additional clamping of the cabinet door against the cabinet body in the area of the push-rod lock.
Figure 5:
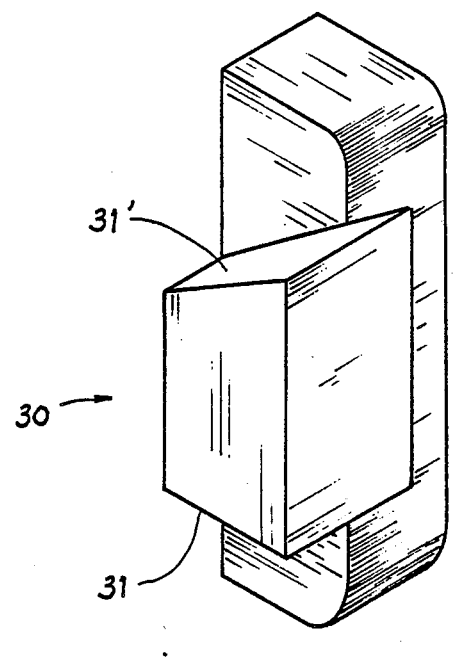
FIG. 5 is an enlarged perspective view of the lock block of the apparatus of FIGS. 1-4.

During this motion, locking nose 25 of hasp 24 comes onto the back side of holding block 28 which faces away from the cabinet door in the area of a recess 29 and this brings an additional clamping of cabinet door 10 toward the cabinet body, in the area of push-rod lock 12 as shown in FIG. 4. The back side of holding block 28 can be designed in such a way that an additional door-closing motion is achieved when locking nose 25 is turned onto the back side of holding block 28. As FIG. 3 shows, locking nose 25 of holding block 28 does not interact with holding block 24 until the device reaching the preliminary closed condition.

Next to bearing plates 18b and facing cabinet door 10, closing end 18 has an inclined locking surface 18a which cooperates with transition surface 31 of the respective lock block 30 after moving beyond the preliminary closing position. After reaching the final closing position, the clamping and closing force is transferred to cabinet door 10.

Cabinet door 10 is then clamped and locked at three points along the closing edge.

On opening push-rod lock 12, first the clamping and locking of cabinet door 10 is removed and then cabinet door 10 is finally released as rollers 19 move over transition surfaces 31 of lock block 30.

Since the rollers must pass over locking ridges 34 in the transition from the inclined transition surfaces 31 to back sides 32 of the lock blocks, closing ends 18 of push rods 13 and 21 are sealed in the closed position. Therefore, to open cabinet door 10, this lock must first be overcome. To do so, cabinet door 10 must be brought even closer to the cabinet body, that is, it must be put under even more tension so that rollers 19 can move over lock ridges 34.

We claim:

1. In a switch cabinet latch of the type having a cabinet body and a door hinged thereto which may be held in closed position by a door-mounted push-rod lock along a closing edge, the lock having push rods extending therefrom and an actuating element which when rotated moves the push rods axially, the push rods having closing ends which in the closed position reach behind closing faces mounted on the cabinet body and in the open position are away from the closing faces, the improvement comprising:
   rollers rotatably mounted on the closing ends on the push rods;
   lock blocks mounted on the cabinet body, each block having one of said closing faces substantially parallel to the door and facing away therefrom and a transition surface at an acute angle to the direction of push-rod movement facing away from the cabinet door, such that turning of the actuating element moves the rollers from the open position first against the transition surfaces to impart a closing movement to the door and then onto the door-parallel closing faces;
   the closing ends having lock surfaces inclined toward the door in position to cooperate with the closing-block transition surfaces to clamp the door against the cabinet body;
   a holding block mounted on the cabinet body; and
   a hasp on the actuating element with a locking nose extending radially therefrom positioned such that further turning of the actuating element, with said rollers already on said door-parallel closing faces, moves the locking nose behind the holding block to clamp the door to the cabinet body in the area of the push-rod lock.

2. The switch cabinet latch of claim 1 wherein the axes of rotation of the rollers are parallel to the cabinet door and substantially perpendicular to the closing edge.

3. The switch cabinet latch of claim 1 wherein each of the closing ends comprises two bearing plates in position away from the push rods, the roller rotatably mounted therebetween, said inclined closing end lock surface adjoining the bearing plates and facing the cabinet door.

4. The switch cabinet latch of claim 3 wherein the axes of rotation of the rollers are parallel to the cabinet door and substantially perpendicular to the closing edge.

5. The switch cabinet latch of claim 1 wherein each lock block is symmetrical about a middle transverse plane, with two oppositely inclined transition surfaces facing away from the cabinet door.

6. The switch cabinet latch of claim 1 wherein said holding block has a semicircular recess in the area of the axis of rotation of the hasp, the diameter in the recess corresponding to the diameter of the hasp, whereby when said push rods are in the open position the radially-projecting hasp locking nose is substantially perpendicular to the direction of push-rod movement and outside the recess while only after turning the hasp in the closing direction through a given angle does the locking nose move into the area of the recess on the side of the holding block away from the door to clamp the door to the cabinet body in the area of the push-rod lock.

7. The switch cabinet latch of claim 1 wherein the cabinet body has a frame which forms a sealing edge along the open side of the cabinet body and the inside of the door has a sealing element along the outer edge thereof positioned to engage the sealing edge of the cabinet body.

8. The switch cabinet latch of claim 7 wherein the axes of rotation of the rollers are parallel to the cabinet door and substantially perpendicular to the closing edge.

9. The switch cabinet latch of claim 8 wherein each of the closing ends comprises two bearing plates in position away from the push rods, the roller rotatably mounted therebetween, said inclined closing end lock surface adjoining the bearing plates and facing the cabinet door.

10. In a switch cabinet latch of the type having a cabinet body and a door hinged thereto which may be held in closed position by a door-mounted push-rod lock along a closing edge, the lock having push rods extending therefrom and an actuating element which when rotated moves the push rods axially, the push rods having closing ends which in the closed position reach behind closing faces mounted on the cabinet body and in the open position are away from the closing faces, the improvement comprising:
   rollers rotatably mounted on the closing ends on the push rods;
   the push rods having free ends and the closing ends being separate parts connected to the push-rod free ends;
   each closing end and its respective push rod being held between a pair of guide parts;
   sleeve-shaped guide housings connected to the cabinet door, each pair of guide parts and the closing end therebetween being guided within one of said guide housings;
   lock blocks mounted on the cabinet body, each block having one of said closing faces facing away from the door and a transition surface at an acute angle to the direction of push-rod movement facing away from the cabinet door, such that turning of the actuating element moves the rollers from the open position first against the transition surfaces to impart a closing movement to the door and then onto the closing faces;

the closing ends having lock surfaces inclined toward the door in position to cooperate with the closing-block transition surfaces to clamp the door against the cabinet body;

a holding block mounted on the cabinet body; and a hasp on the actuating element with a locking nose extending radially therefrom positioned such that further turning of the actuating element moves the locking nose behind the holding block to clamp the door to the cabinet body in the area of the push-rod lock.

11. The switch cabinet latch of claim 10 wherein the two guide parts, the respective push rods, and the respective closing ends are held together by a cross pin which is inserted into aligned bores of these parts and held there by the guide housing.

12. The switch cabinet latch of claim 10 wherein each of the closing ends comprises:

two bearing plates in position away from the push rods, the roller rotatably mounted therebetween; and an inclined locking surface adjoining the bearing plates and facing the cabinet door.

13. The switch cabinet latch of claim 12 wherein the axes of rotation of the rollers are parallel to the cabinet door and substantially perpendicular to the closing edge.

14. The switch cabinet latch of claim 13 wherein the two guide parts, the respective push rods, and the respective closing ends are held together by a cross pin which is inserted into aligned bores of these parts and held there by the guide housing.

15. In a switch cabinet latch of the type having a cabinet body and a door hinged thereto which may be held in closed position by a door-mounted push-rod lock along a closing edge, the lock having push rods extending therefrom and an actuating element which when rotated moves the push rods axially, the push rods having closing ends which in the closed position reach behind closing faces mounted on the cabinet body and in the open position are away from the closing faces, the improvement comprising:

rollers rotatably mounted on the closing ends on the push rods;

lock blocks mounted on the cabinet body, each block having one of said closing faces facing away from the door and a transition surface at an acute angle to the direction of push-rod movement facing away from the cabinet door such that turning of the actuating element moves the rollers from the open position first against the transition surfaces to impart a closing movement to the door and then onto the closing faces, said lock blocks each having a locking ridge between the transition surface and the back side thereof which said rollers pass over in movement between the transition surface and the back side, said locking ridges serving to maintain the rollers behind the lock blocks when the door is fully closed;

the closing ends having lock surface inclined toward the door in position to cooperate with the closing-block transition surfaces to clamp the door against the cabinet body;

a holding block mounted on the cabinet body; and a hasp on the actuating element with a locking nose extending radially therefrom positioned such that further turning of the actuating element moves the locking nose behind the holding block to clamp the door to the cabinet body in the area of the push-rod lock.

16. In a switch cabinet latch of the type having a cabinet body and a door hinged thereto which may be held in closed position by a door-mounted push-rod lock along a closing edge, the lock having push rods extending therefrom and an actuating element which when rotated moves the push rods axially, the push rods having closing ends which in the closed position reach behind closing faces mounted on the cabinet body and in the open position are away from the closing faces, the improvement comprising:

rollers rotatably mounted on the closing ends on the push rods, said rollers having axes of rotation which are substantially parallel to the cabinet door and substantially perpendicular to the closing edge;

the push rods having free ends and the closing ends being separate parts connected to the push-rod free ends;

each closing end and its respective push rod being held between a pair of guide parts;

sleeve-shaped guide housings connected to the cabinet door, each pair of guide parts and the closing end therebetween being guided within one of said guide housings;

lock blocks mounted on the cabinet body, each block having one of said closing faces facing away from the door and a transition surface at an acute angle to the direction of push-rod movement facing away from the cabinet door, such that turning of the actuating element moves the rollers from the open position first against the transition surfaces to impart a closing movement to the door and then onto the closing faces;

each closing end having: a lock surface inclined toward and facing the door in position to cooperate with one of the closing-block transition surfaces to clamp the door against the cabinet body; and two bearing plates in position away from the push rods with the roller rotatably mounted therebetween, said inclined closing end lock surface adjoining the bearing plates;

a holding block mounted on the cabinet body;

a hasp on the actuating element with a locking nose extending radially therefrom positioned such that further turning of the actuating element moves the locking nose behind the holding block to clamp the door to the cabinet body in the area of the push-rod lock; and the cabinet body having a frame which forms a sealing edge along the open side of the cabinet body and the inside of the door having a sealing element along the outer edge thereof positioned to engage the sealing edge of the cabinet body, whereby the door may be sealed tightly closed.

17. The switch cabinet latch of claim 16 wherein the two guide parts, the respective push rods, and the respective closing ends are held together by a cross pin which is inserted into aligned bores of these parts and held there by the guide housing.

18. The switch cabinet latch of claim 17 wherein the lock blocks each have a locking ridge between the transition surface and the back side thereof which the rollers pass over in movement between the transition surface and the back side, thereby serving to maintain the rollers behind the lock block when the door is fully closed.

19. The switch cabinet latch of claim 18 wherein each lock block is symmetrical about a middle transverse plane, with two oppositely inclined transition surfaces facing away from the cabinet door.

20. The switch cabinet latch of claim 19 wherein said holding block has a semicircular recess in the area of the axis of rotation of the hasp, the diameter of the recess corresponding to the diameter of the hasp, whereby when said push rods are in the open position the radially-projecting hasp locking nose is substantially perpendicular to the direction of push-rod movement and outside the recess while only after turning the hasp in the closing direction through a given angle does the locking nose move into the area of the recess on the side of the holding block away from the door to clamp the door to the cabinet body in the area of the push-rod lock.

* * * * *